(12) United States Patent
Pascariello et al.

(10) Patent No.: US 9,225,696 B2
(45) Date of Patent: Dec. 29, 2015

(54) METHOD FOR DIFFERENT USERS TO SECURELY ACCESS THEIR RESPECTIVE PARTITIONED DATA IN AN ELECTRONIC APPARATUS

(71) Applicant: STMICROELECTRONICS S.r.l., Agrate Brianza (IT)

(72) Inventors: Vincenzo Pascariello, San Nicola la Strada (IT); Rosario Bosco, Portici (IT)

(73) Assignee: STMICROELECTRONICS S.R.L., Agrate Brianza (MB) (IT)

( * ) Notice: Subject to any disclaimer, the term of this patent is extended or adjusted under 35 U.S.C. 154(b) by 116 days.

(21) Appl. No.: 14/103,086

(22) Filed: Dec. 11, 2013

(65) Prior Publication Data

US 2014/0173282 A1 Jun. 19, 2014

(30) Foreign Application Priority Data

Dec. 19, 2012 (IT) .............................. MI2012A2183

(51) Int. Cl.
- *H04L 29/06* (2006.01)
- *H04L 9/08* (2006.01)
- *G06F 21/62* (2013.01)
- *G06F 21/78* (2013.01)

(52) U.S. Cl.
CPC .......... *H04L 63/061* (2013.01); *G06F 21/6218* (2013.01); *G06F 21/6281* (2013.01); *H04L 9/0844* (2013.01); *H04L 63/08* (2013.01); *G06F 21/78* (2013.01); *G06F 2221/2153* (2013.01)

(58) Field of Classification Search
CPC .......................... G06F 21/6218; H04L 63/061
USPC .......................................................... 713/171
See application file for complete search history.

(56) References Cited

U.S. PATENT DOCUMENTS

| 8,181,028 B1* | 5/2012 | Hernacki et al. ............... 713/182 |
|---|---|---|
| 2003/0157926 A1* | 8/2003 | Ala-Laurila et al. .......... 455/406 |
| 2006/0242151 A1* | 10/2006 | Jogand-Coulomb et al. ..... 707/9 |
| 2007/0150420 A1* | 6/2007 | Iwamoto et al. ................ 705/71 |
| 2008/0107261 A1* | 5/2008 | Kistner .................... G06F 21/78 380/29 |
| 2008/0155258 A1* | 6/2008 | Obereiner et al. ............ 713/168 |
| 2009/0116649 A1* | 5/2009 | Perlman ........................ 380/277 |
| 2010/0098246 A1 | 4/2010 | Ward |

(Continued)

FOREIGN PATENT DOCUMENTS

| EP | 0471538 | 2/1992 |
|---|---|---|
| EP | 2104054 | 9/2009 |
| EP | 2207123 | 7/2010 |

*Primary Examiner* — Izunna Okeke
*Assistant Examiner* — Bryan Wright
(74) *Attorney, Agent, or Firm* — Allen, Dyer, Doppelt, Milbrath & Gilchrist, P.A.

(57) ABSTRACT

An access process for an electronic device includes storing encrypted partitions in a storage area of the electronic device, with each encrypted partition corresponding to a registered user. A secure element is received from a registered user, with the secure element storing a user key for decrypting an encrypted partition corresponding to the register user providing the user key. A temporary secure channel is established between the secure element and the electronic device, and a registered user associated to one of the encrypted partitions is authenticated in the electronic device. An identification of the registered user authenticated in the electronic device is transmitted to the secure device, and the user key of the authenticated registered user is transmitted from the secure element to the electronic device over the temporary secure channel.

20 Claims, 8 Drawing Sheets

(56) References Cited

U.S. PATENT DOCUMENTS

| | | |
|---|---|---|
| 2010/0185843 A1 | 7/2010 | Olarig et al. |
| 2012/0131336 A1* | 5/2012 | Price ........................ G06F 21/78 713/165 |
| 2012/0151223 A1* | 6/2012 | Conde Marques et al. ... 713/193 |
| 2012/0191975 A1* | 7/2012 | Asnaashari ............. G06F 21/34 713/168 |
| 2012/0297205 A1* | 11/2012 | Yuen ........................ G06F 21/31 713/193 |
| 2013/0073854 A1* | 3/2013 | Patti et al. ...................... 713/171 |
| 2014/0122329 A1* | 5/2014 | Naggar ............. G06Q 20/3552 705/41 |

* cited by examiner

METHOD FOR DIFFERENT USERS TO SECURELY ACCESS THEIR RESPECTIVE PARTITIONED DATA IN AN ELECTRONIC APPARATUS

FIELD OF INVENTION

The present invention relates to a method to access data in an electronic apparatus, for example in a mobile device or a computer device. More particularly, the invention relates to a method of the type cited above in which data of a user in the electronic apparatus are protected from access of another user. The invention further relates to an electronic apparatus to access data in the electronic apparatus.

BACKGROUND OF THE INVENTION

As known, an electronic apparatus such as a mobile device, smart-phone, a tablet, a phablet, a net-book or a notebook includes an operative system, for example, Windows 8, iPhone OS, or Android OS, which manages access to data stored in a memory of the electronic device.

Some of the above operative systems manage a multi-user interface or multi-user profile for separating data stored in the memory and belonging to different users. For instance, each time a user is registered in the electronic apparatus, the operative system associates to the user a corresponding set of folders and subfolders. Thus, several users having access to the electronic apparatus, share the same memory as hardware, but have a dedicated portion of such a memory corresponding to their set of folders and sub-folders storing their data, preferably in a logical or virtual portion of the memory.

However, the above mentioned electronic apparatus may not typically have a security-system for protecting user personal data, such as personal files, SMS messages, emails, etc.

For example, in MS Windows, each user has his own workspace, e.g. corresponding to the folder ' . . . \ Documents and Settings', including all data, files and settings of a single user. However, such a separation is just for organization and not really for security. For instance, a user with administrator privileges has access to all the folders and sub-folders of all the users, and thus to all their files. Moreover, if the mass storage is accessed using another O.S., all the data of all users may be read.

Furthermore, some other operating systems may not support a multi-user interface, and, thus do not provide logical or virtual separation for different users. Thus, electronic apparatuses with such system cannot prevent that data of a user being read by another user.

On the other hand, a method for protecting the access to data through encryption is known, in which the whole content of the mass storage device is encrypted to avoid any access to the data mass storage. For example, MS Windows Vista implemented a "BitLocker Drive Encryption", which is derived from specifications of the Trusted Computing Group.

However, these methods have some other limitations. First of all they are based on dedicated hardware, i.e. a TPM (Trusted Platform Module) chip. An electronic apparatus without or incompatible with such dedicated hardware cannot protect the access to data.

Moreover, a brute force attack which decrypts the whole memory content deprives all data of all the users from protection. Indeed, "BitLocker Drive Encryption" has been designed mainly for anti-piracy and not for user's data security.

Furthermore, encrypting all the memory content is time consuming and slows down the read or write operations, especially when accessing data which does not require protection. At last, if the TMP is stolen together with the device, all the data of all the users may be decrypted and read.

A shortcoming of the prior art is to provide a method to access data in an electronic apparatus which prevents the user of the apparatus from reading data associated with another user of the apparatus, independently from the access rights or level or roles defined in the electronic apparatus for such users.

SUMMARY OF THE INVENTION

The approach disclosed herein is to create, in the memory of an electronic apparatus, a partition for each user registered in the electronic apparatus, wherein the data of the user is encrypted with a key not included in the electronic apparatus. More particularly, the partition is at an operative system level. The key for encrypting data to be stored in the partition or for decrypting such data, when the user wants to read it, is stored in a secure element which is connected to the electronic apparatus by the user, when needed.

Advantageously, different users that use the same electronic apparatus have different keys, embedded on different portable supports or devices, for example on personal IC Cards, and the memory of the electronic apparatus is partitioned and associated with a corresponding user. Each partition is encrypted with the personal key of the user. Thus, if one user's key is stolen, data of all the other users cannot be decrypted or read, because they are associated with different keys, for example, stored in different IC Cards.

Accordingly, a public device, for example, a mobile phone of a company, may be shared among a plurality of users, i.e. it may be used at different times by such users. Each user may transfer in encrypted format all his personal data, for example, his address book, from his personal secure element, for example, from his IC Card, to a memory of the mobile phone of the company.

Thus, when a user uses the mobile phone, he may read his personal data from the memory of the mobile device, using his IC Card (secure element) to allow the mobile phone to decrypt his personal data from the memory, but he cannot read data of other users which are encrypted with a different key in the memory of the mobile phone.

The same may be applied to share, for example, the electronic apparatus embedded in a public car or vehicle, among several users which rent the car or vehicle.

The partition of the user cannot be read or accessed by any other user, independently from the other user access rights, levels or roles within the electronic apparatus or within the operative system of the electronic apparatus.

Accordingly, the shortcomings of the prior art are addressed with an electronic apparatus comprising a processor and a storage area including one or more encrypted partitions, and a secure element which stores at least a user key for decrypting one of the encrypted partitions.

In one aspect, each encrypted partition corresponds to one user having access to the electronic apparatus. And the electronic apparatus manages a multi user or multi profile environment in which data of a user is virtually or logically separated from the data on another user in the partitions.

A temporary secure channel between the secure element and the electronic apparatus is established for communicating the key from the secure element to the electronic apparatus. The secure channel may be established as soon as the secure element is connected to the electronic apparatus; preferably, the secure channel is established after the user has been authenticated in the electronic apparatus.

Each authenticated user in the electronic apparatus is associated to one of the encrypted partitions. For retrieving the secure key in the secure element, an identification of the user authenticated in the electronic apparatus is transmitted to the secure element, wherein the key corresponding to the user is retrieved and transmitted to the electronic apparatus over the temporary secure channel.

Various embodiments for transmitting the key from the secure element to the electronic apparatus are provided. In one embodiment, the secure channel is established only after the authentication of the user in the electronic apparatus and the key is transmitted from the secure element, as soon as the authentication is completed, preferably together with the user identification. Receiving the key with the user identification, the electronic device checks if the user identification received corresponds to the identity of the user authenticated in the electronic device and only in such a case the electronic device continues to decrypt requested data; otherwise, if no correspondence is detected, the access to the data is denied.

The electronic apparatus is programmed to decrypt the encrypted partition of the authenticated user with the user key transmitted over the temporary secure channel, once the key is received. Thus a decryption module is stored in the electronic device.

The encrypted partition of the authenticated user is not accessible to the authenticated user or to any other authenticated users in the electronic apparatus if the user key of the authenticated user is not transmitted to the electronic apparatus. Thus, the protection for the user's data stored in the encrypted partition improves because the encrypted partition is decrypted only when the key in the secure element can be retrieved by the apparatus.

In another aspect, the secure element is an IC Card of a telecom operator and the telecom operator blocks the IC Card to deny a decryption of the encrypted partition on a user's request, preferably through over the air (OTA) messaging. Due to this feature, the encrypted partition can be protected when the apparatus is stolen together with the secure element since the secure element is blocked and the key cannot be retrieved for decrypting data. More particularly, the key is not stored in the electronic apparatus so that without the availability of the secure element, the encryption/decryption module of the electronic apparatus cannot encrypt/decrypt the data in the partition.

In another aspect, the user key received from the secure element is stored in a RAM or in a secure area of the memory of the electronic apparatus for a login session of the user in the electronic apparatus, and wherein the user key is deleted from the RAM or from the secure area when the login session is closed. Thus, the security for the encrypted partition is further guaranteed.

In another aspect, the secure element may be a SIM card, an SD card or a Secure Dongle. The encrypted partition may store at least one of personal data, files, an application, and application data. Since secure element is physically detachable from the electronic apparatus, the secure element can be kept in a different place separated from the apparatus when the encrypted partition is not accessed for a period of time.

In another aspect, the secure channel may be created through a key agreement protocol based on a Diffie-Hellman key exchange. An elliptic curve Diffie-Hellman (ECDH) protocol may also be used.

In another aspect, the secure element may store at least one record in an internal memory, wherein a first field of the record includes data associated with the username of the user, for example, the identification of the user, and a second field of the record includes data associated with the user key. Thus, key linked to a specific user can be retrieved through the corresponding user's identification data.

In another aspect, the authentication by the electronic apparatus may be executed by the username and the corresponding password input by the user into the electronic apparatus through a user interface of the electronic apparatus, and the username input is used for searching the user key in the secure element. In another aspect, different user interfaces are used from authentication in the electronic device, comprising, for example, finger print or biometric means or circuits.

In another aspect, a record is created in the secure element each time a new user enters a username and a password not previously stored in the electronic apparatus, and the key for the new user is created in the secure element and associated with the username in the record created in the secure element. Thus, more than one user can share one apparatus with enhanced privacy.

In another aspect, another electronic apparatus device is configured to establish a wireless connection with the electronic apparatus through a wireless protocol, preferably near field communication (NFC), the key stored in the secure element is transmitted to said another electronic apparatus through the secure channel and said wireless connection is established after the user is authenticated in the electronic device. Thus, the user's profile data which is used in one device can be restored conveniently in other device without moving the secure element from one device to the other device. The security for the user's data is also guaranteed.

In another aspect, the encrypted partition is configured to be downloaded into a second electronic apparatus from the electronic apparatus or from a cloud storage storing a duplicated data associated with the encrypted partition. Thus, a method for controlling access to data distributed on a remote storage, such as the cloud or the second electronic apparatus, is provided.

The technical problem described above is also addressed by an electronic apparatus comprising a processor and a storage area including one or more encrypted partitions, characterized by comprising: means, or circuitry, for establishing a temporary secure channel to communicate with a secure element which stores at least a user key for decrypting one of said encrypted partitions; means, or circuitry for authenticating in the electronic apparatus a user which is associated to one of the encrypted partitions; means, or circuitry, for transmitting an identification of the user authenticated in the electronic apparatus to the secure element and for receiving a user key of the authenticated user from the secure element over the temporary secure channel. Wherein the electronic apparatus is programmed to decrypt the encrypted partition of the authenticated user with the user key transmitted over the temporary secure channel, and wherein the encrypted partition of the authenticated user is not accessible to the authenticated user or to any other authenticated users in the electronic apparatus if the user key of the authenticated user is not transmitted to the electronic apparatus.

The technical problem described above is also addressed by a secure element, preferably an IC Card, for accessing an electronic apparatus including a storage area with one or more encrypted partitions, characterized by storing at least a user key for decrypting one of said encrypted partitions and means, or circuitry, for establishing a temporary secure channel to communicate with the electronic apparatus; means, or circuitry, for receiving an identification of a user authenticated in the electronic apparatus and for transmitting the user key of the authenticated user to the electronic apparatus over the temporary secure channel. The secure element may be also a SIM card, an SD card or a Secure Dongle and maybe embedded or removable from the electronic device.

Further advantages and features of the method, and the apparatus will be apparent from the description given here below only for exemplificative purpose and without limiting the scope of protection of the present invention.

DETAILED DESCRIPTION OF THE PREFERRED EMBODIMENTS

The accompanying drawings, which are included to provide a further understanding of the disclosure and are incorporated in and constitute a part of this application, illustrate embodiment(s) of the disclosure and together with the description serve to explain the present embodiments.

Figure 1A:
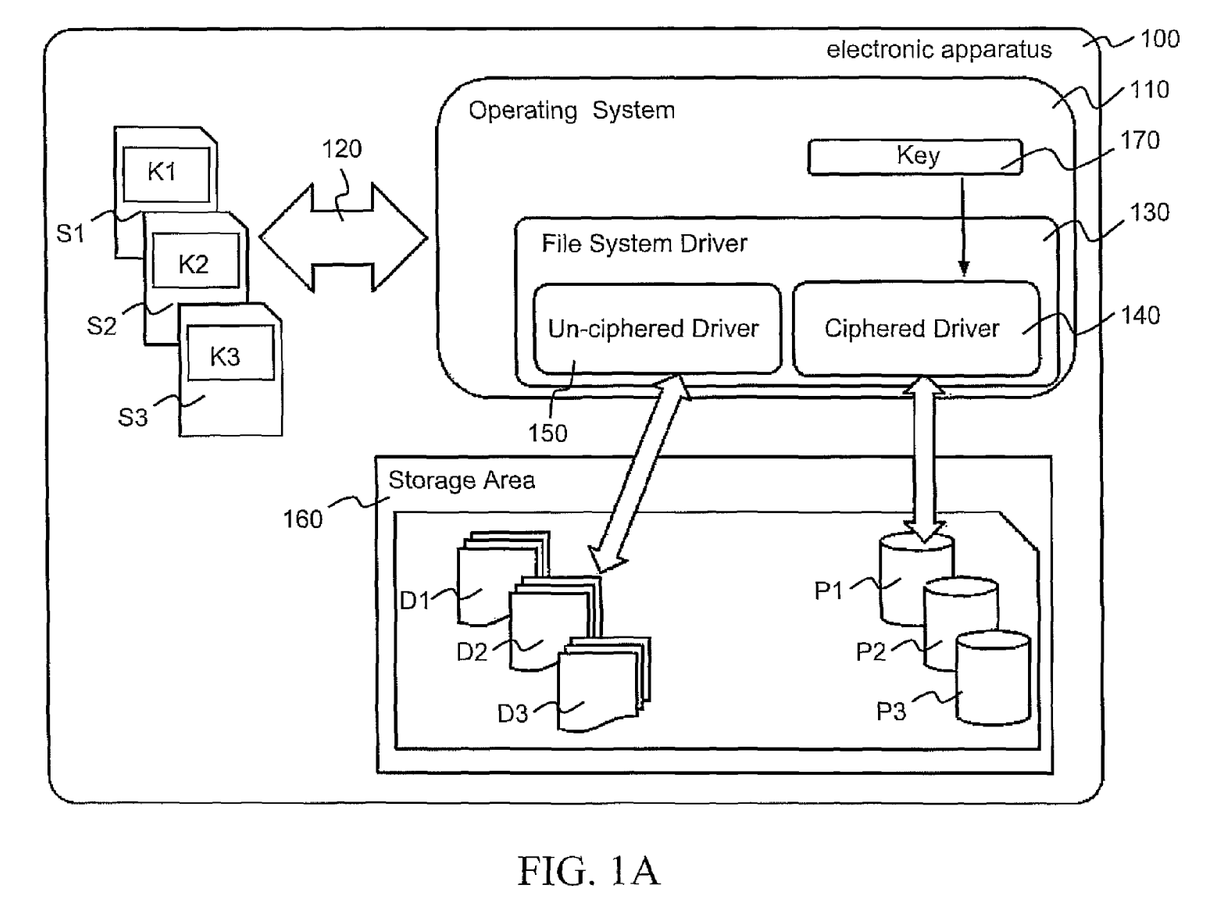
FIG. 1A schematically represent an electronic apparatus including encrypted partitions, according to the invention.

FIG. 1 schematically represents an electronic apparatus 100 comprising a processor and a storage area 160 with one or more encrypted partitions P1, P2, P3. The electronic apparatus 100 includes and is controlled by an operating system 110 including a file system driver 130 with an un-ciphered driver 150 and a ciphered driver 140.

The un-ciphered driver 150 is a conventional file driver which does not perform encryption or decryption to access files stored in the storage area 160. The ciphered driver 140 performs encryption and decryption to access to the files stored in the storage area 160.

More particularly, the storage area 160 includes non-encrypted partitions D1, D2, D3 and the encrypted partitions P1, P2, P3. The ciphered driver 140 has access to the encrypted partitions P1, P2, P3 through a corresponding key 170 which is temporarily stored in a memory of the operating system 110.

For saving data into one of the encrypted partition P1, P2, P3, the operating system 110 calls a function ('save' function) provided by the ciphered driver 140 with the data and the key 170. The ciphered driver 140 encrypts data with the key 170 and stores the encrypted data into one of the encrypted partitions P1, P2, P3.

On the other side, for loading data from one of the encrypted partitions P1, P2, P3, the operating system 110 calls another function ('load' function) provided by the ciphered driver 140 with the key 170. The ciphered driver 140 decrypts the data with the key 170 and provides the decrypted data to the operating system 110.

For accessing the data in a partition of the electronic apparatus, a secure element (SE) S1, S2, S3 is used, i.e. a tamper-resistant platform, for example, a one chip secure microcontroller, capable of securely hosting applications and their confidential and cryptographic data, e.g. key management, in accordance with the rules and security requirements set forth by a set of well-identified trusted authorities.

The secure element S1, S2, S3 may be an IC Card or a SIM card, an SD card or a Secure Dongle. The secure element S1, S2, S3 may be embedded or removable from the electronic device 100.

Figure 1B:
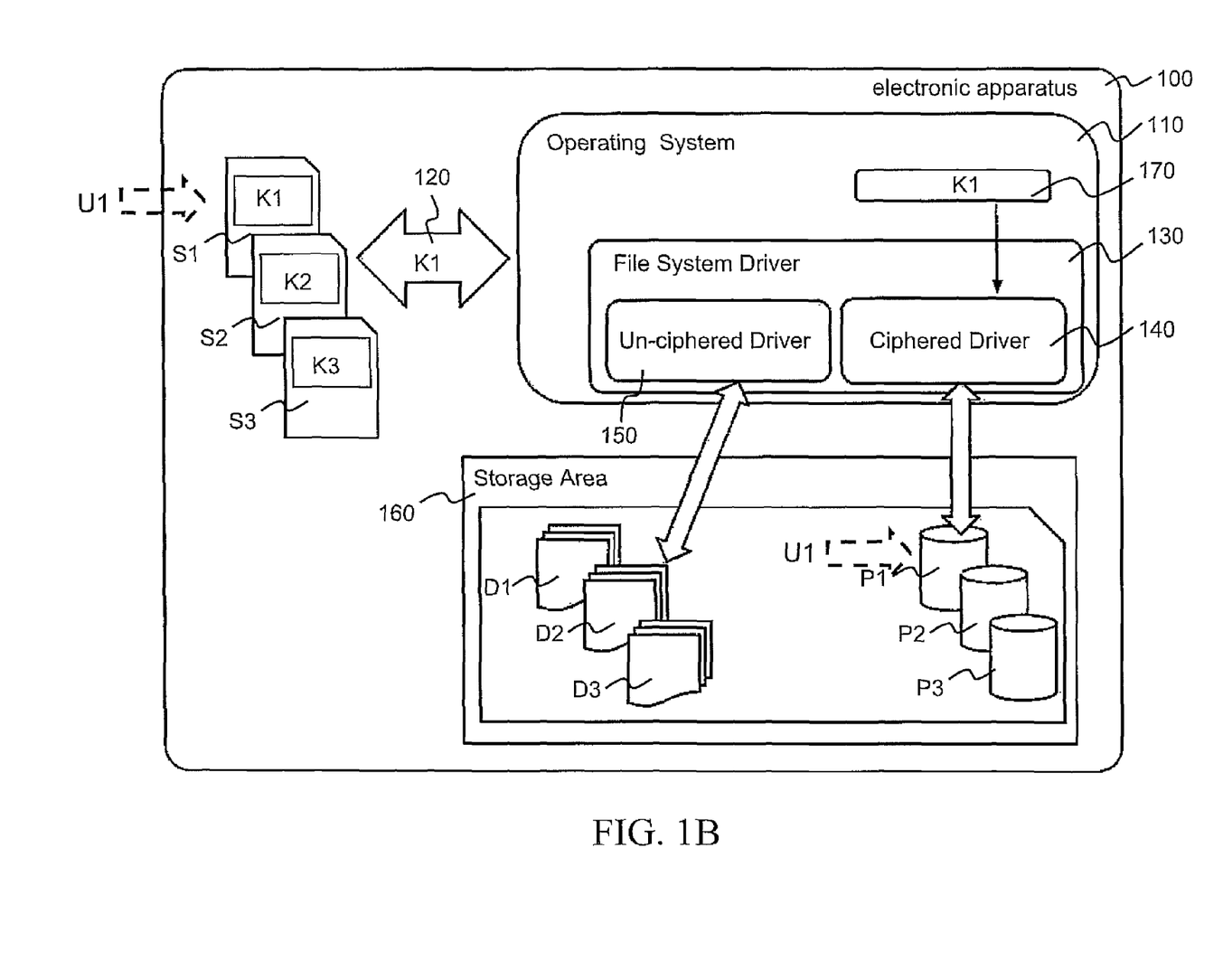
FIG. 1B schematically represents the electronic apparatus of FIG. 1A, when a first user logs in to the electronic apparatus.

In FIG. 1B, each secure element includes a key corresponding to an encrypted partition. In other words, a first secure element S1 includes a first key K1 for encrypting and/or decrypting the first encrypted partition P1, a second secure element S2 includes a second key K2 for encrypting and/or decrypting the second encrypted partition P2, and a third secure element S3 includes a third key K3 for encrypting and/or decrypting the third encrypted partition P3.

The operating system 110 or the electronic apparatus 100 communicates with the secure element S1, S2, S3 through a temporary secure channel 120. The temporary secure channel 120 is established between the secure element S1, S2, S3 and the electronic apparatus 100 or the operating system 110 temporarily, preferably after the user having permission to access the key in the secure element logs on the operating system 110. The secure channel 120 may be created through a key agreement protocol based on, e.g., a Diffie-Hellman key exchange.

When a first user U1 accesses its first encrypted partition P1, he is authenticated by the operating system 110 or the electronic apparatus 100 first. For example, the electronic apparatus 110 prompts a request of user name and password on a 'login' screen and the first user U1 input its username and password. The operating system 110 or the electronic apparatus 100 performs authentication based on the username and password provided on its own, as represented in FIG. 1B.

If the authentication succeeds, the operating system 110 or the electronic apparatus 100 further requests to the first secure element S1 to receive the first key S1. In this case, the first user U1 is the proprietor of the first secure element S1, or has a permission to access the first secure element S1. Then, the temporary secure channel 120 is established by the key agreement protocol and the first key K1 is transmitted over the temporary secure channel 120 to the operating system 110 or the electronic apparatus 100.

The operating system 110 or the electronic apparatus 110 stores the transferred first key K1 into a memory of the apparatus 100. Preferably, the memory is random access memory (RAM) but it is not limited thereto.

The operating system 110 uses the key K1 (170) to encrypt or decrypt the first encrypted partition P1. Thus, if the corresponding key from the secure element S1, S2, S3 is not delivered to the memory K1 of the apparatus 100 because e.g. failure of authentication or failure of the establishment of temporary secure channel 120, the encrypted partition cannot be accessed. The security for the user's personal data can be improved.

The operating system may be one of Linux, Android from Google, iOS from Apple, and Windows from Microsoft. The specific operating system type does not limit the scope of the embodiments. The storage area 160 may be one of hard disk driver, non-volatile memory such as flash memory including NAND, hybrid hard disk driver (H-HDD) or solid state driver (SSD). The key 170 may comprise one key used for encryption and decryption of the partition or may comprise a pair of keys, e.g. private key and public key, where different key is used for each of decryption and encryption. The key K1 is deleted and removed from the memory of the electronic device after a communication with secure element is terminated or when the security channel is closed.

The electronic apparatus 100 may include one secure element S1. The secure element can be embedded into the electronic apparatus 100 and the electronic apparatus may be configured to receive onto or be connected to other secure elements. The electronic apparatus 100 may also embed a plurality of secure elements S1, S2, S3 at the same time. For instance the electronic apparatus is a mobile device having more than one SIM card (secure element), for example, a dual SIM or multi-SIM devices.

Advantageously, the secure access to each partition of the storage is further guaranteed by the use of encrypted partition and key separated from the electronic device and stored in the secure element.

According to one embodiment, the electronic apparatus is accessed by a method providing: a secure element which stores at least a user key for decrypting one of the encrypted partitions; establishing a temporary secure channel between the secure element and the electronic apparatus; authenticating in the electronic apparatus a user which is associated to one of the encrypted partitions; transmitting an identification of the user authenticated in the electronic apparatus to the secure element and transmitting the user key of the authenticated user from the secure element to the electronic apparatus over the temporary secure channel. Wherein the electronic apparatus is programmed to decrypt the encrypted partition of the authenticated user with the user key transmitted over the temporary secure channel, and wherein the encrypted partition of the authenticated user is not accessible to the authenticated user or to any other authenticated users in the electronic apparatus if the user key of the authenticated user is not transmitted to the electronic apparatus.

The protection for the user's data stored in the encrypted partition improves because the encrypted partition is decrypted only when the key in the secure element is retrieved by the apparatus.

Figure 2:
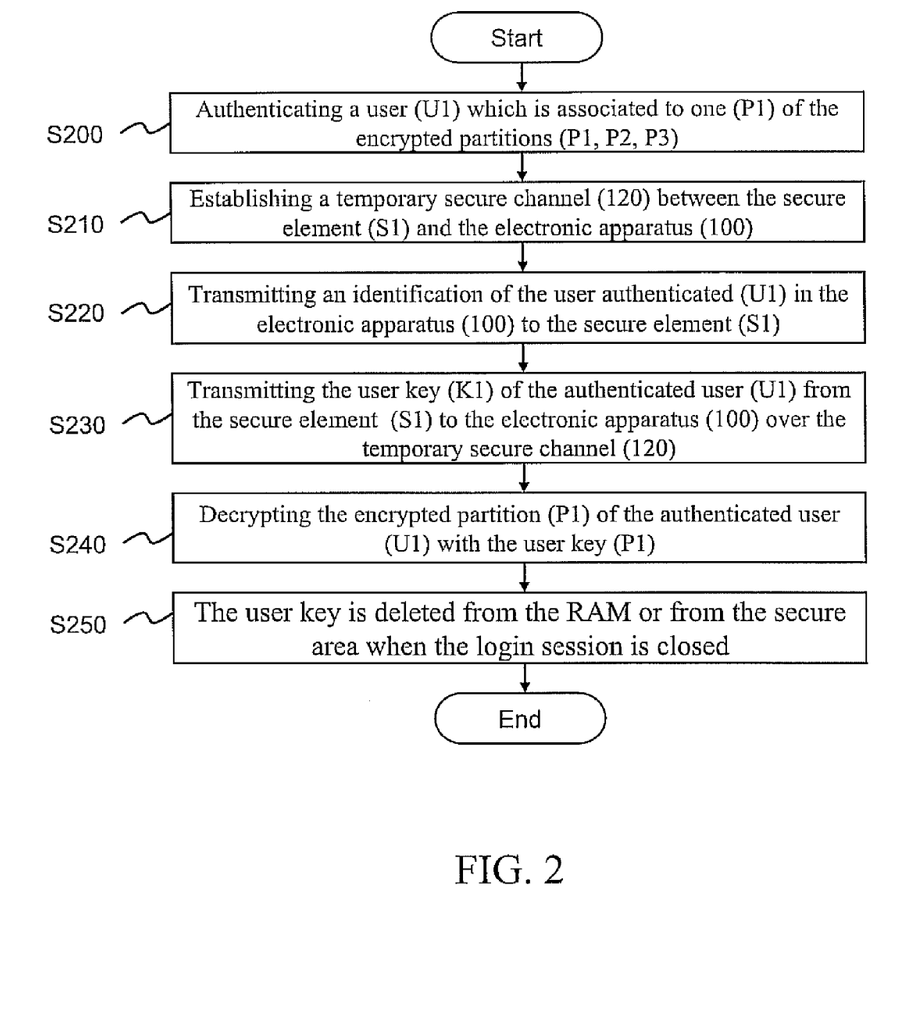
FIG. 2 schematically is a flowchart with the steps of the methods to access data according to the present invention.

The method is explained also with reference to the flowchart of FIG. 2. The electronic apparatus 100 authenticates a user U1 which is associated to one P1 of the encrypted partitions P1, P2, P3 at step S200. The authentication by the electronic apparatus 100 is for instance executed by the username and password inputted by the user U1 into the electronic apparatus 100 through a user interface of the electronic apparatus 100.

A temporary secure channel 120 is established between the secure element S1 and the electronic apparatus 100 at step S210. The electronic apparatus 100 transmits an identification of the user authenticated U1 in the electronic apparatus 100 to the secure element S1 at step S220.

The secure element S1 transmits the user key K1 of the authenticated user U1 to the electronic apparatus 100 over the temporary secure channel 120 at step S230. The secure channel 120 is preferably implemented through a key agreement protocol based, more preferably based on a Diffie-Hellman key exchange. In one embodiment, the secure element S1 stores at least one record in an internal memory, comprising a first field associated with the username of the user U1 and a second field associated or including the user key.

The electronic apparatus decrypts the encrypted partition P1 of the authenticated user U1 with the user key k1 at step S240. The user key is deleted from the RAM or from the secure area when the login session is closed at S250. The user key may also be deleted when the secure channel is closed.

The exact timing for the establishment of the secure channel 120 (Step S210) may vary over implementations. For example, the step S210 can take place after the step S220.

The user key received from the secure element S1 is preferably stored in a RAM 170 or in a secure area 170 of the memory of the electronic apparatus for a login session of the user in the electronic apparatus. The secure element is for instance a SIM card, an SD card or a Secure Dangle and the encrypted partition may store at least one of personal data, files, application, application data.

One use example of the electronic apparatus and the method is protection of user's data in case the apparatus is lost. The secure element is, for example, an IC Card of a telecom operator and the telecom operator may block the IC Card to deny usage of the key and thus a decryption of the encrypted partition P1. Preferably, the block is executed on a user's request, for example, through OTA messaging.

More particularly, Over-the-air programming (OTA) relates to methods for distributing software updates or configuration settings to devices like cell-phones and set-top boxes. For what concern mobile devices, OTA includes the over-the-air service provisioning (OMASP), over-the-air provisioning (OTAP) or over-the-air parameter administration (OTAPA) or provisioning handsets with the necessary settings with which to access services such as WAP or MMS. OTA messaging provides remote control of mobile phones for service and subscription activation, personalization and programming of a new service for mobile operators and third parties.

Figure 3A:
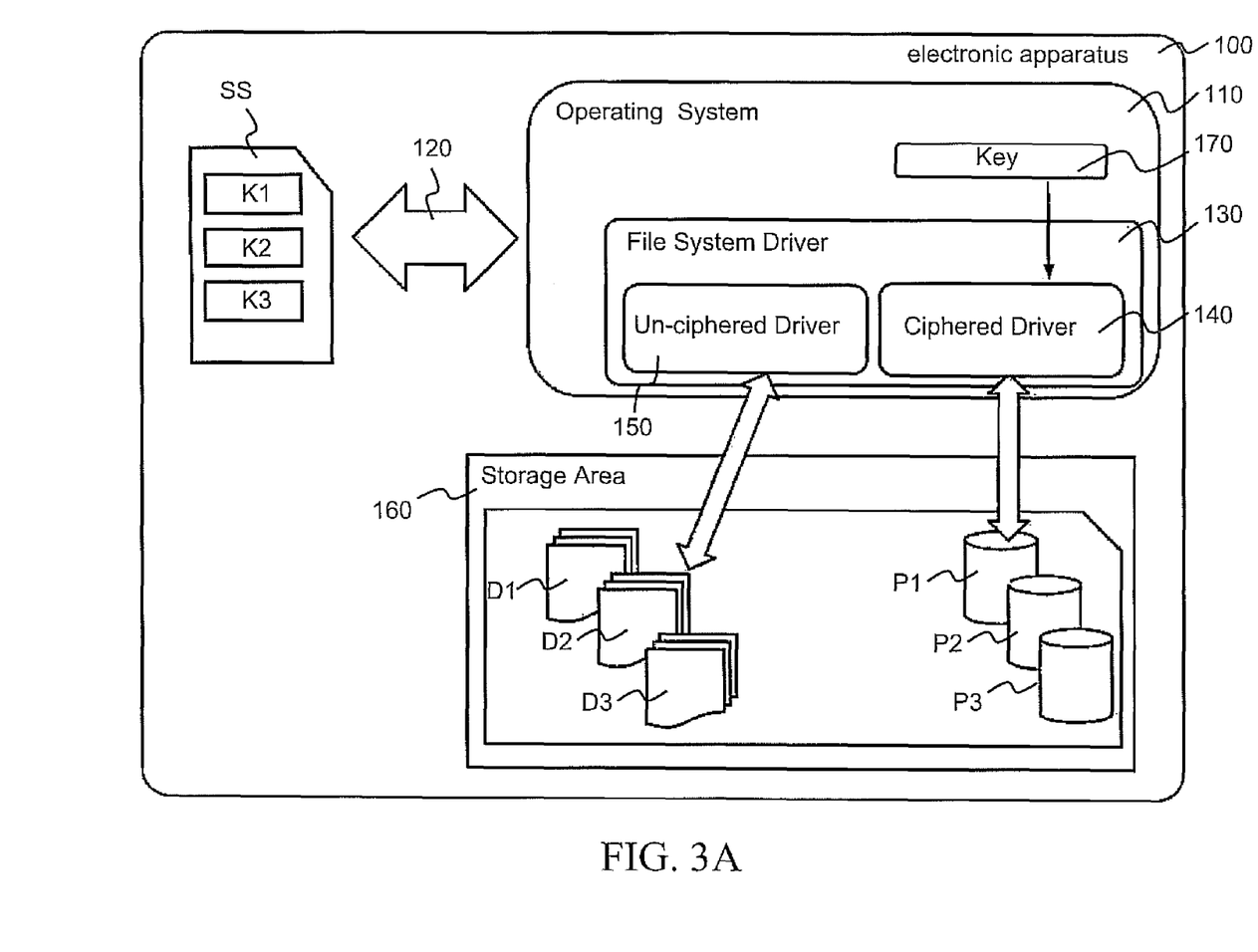
FIG. 3A schematically represents an electronic apparatus according to another embodiment of the present invention.

FIG. 3A schematically represents the electronic apparatus including encrypted partition according to another embodiment of the invention.

A secure element SS stores more than one key K1, K2, K3 each corresponding to an encrypted partition P1, P2, P3 in the electronic device. For example, a first key K1 for encrypting and/or decrypting a first encrypted partition P1, a second key K2 for encrypting and/or decrypting a second encrypted partition P2, and a third key K3 for encrypting and/or decrypting a third encrypted partition P3.

Figure 3B:
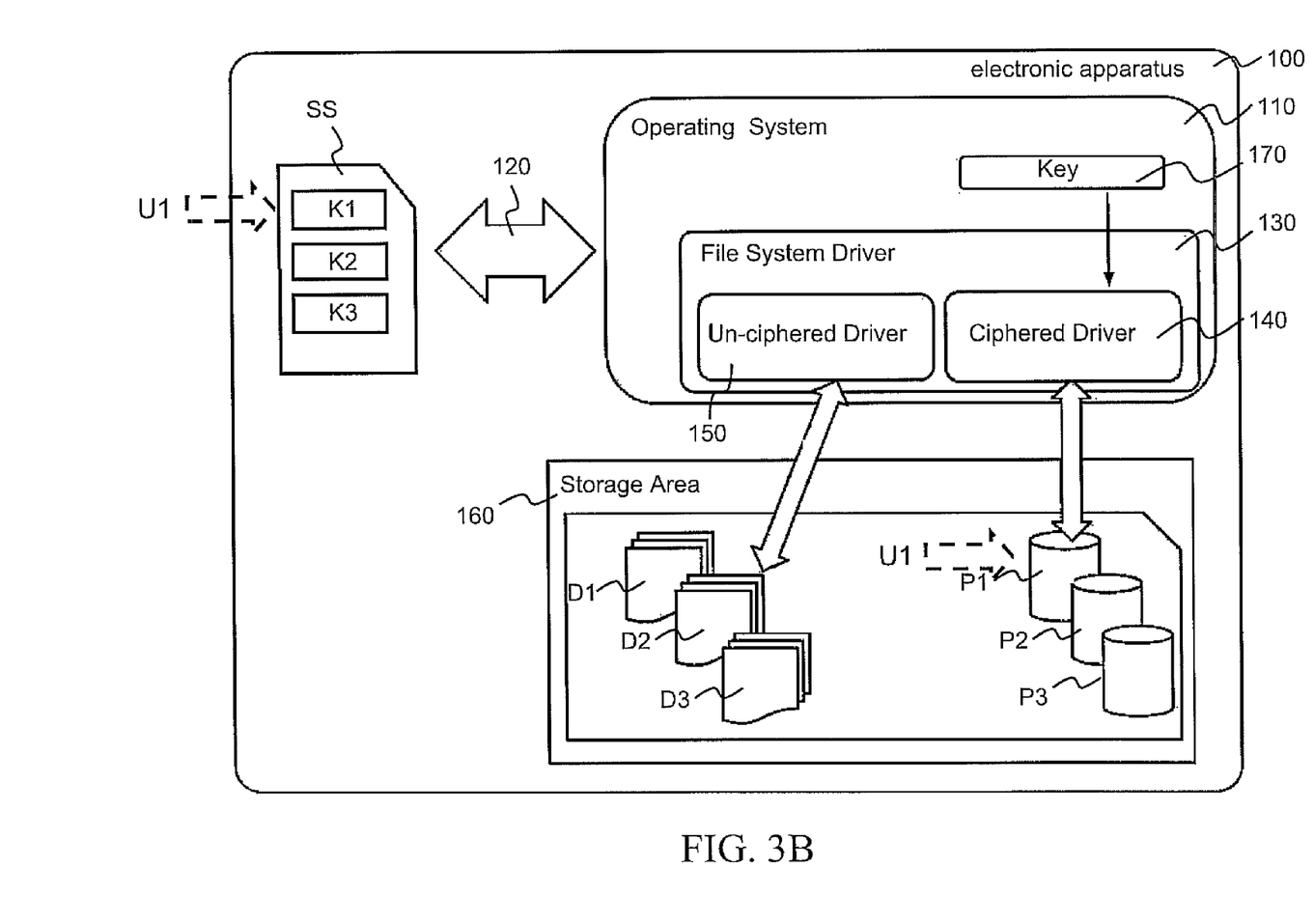
FIG. 3B schematically represent the electronic apparatus according to FIG. 3A, when a first user logs in to the electronic apparatus.

FIG. 3B schematically represent the first user logs into the electronic apparatus.

The operating system 110 or the electronic apparatus 100 communicates with the secure element SS through a temporary secure channel 120. The temporary secure channel 120 is established between the secure element SS and the electronic apparatus 100 or the operating system 110 temporarily, after a user having permission to access the key in the secure element SS logs in the operating system 110. The secure channel 120 is created through a key agreement protocol based on, e.g., a Diffie-Hellman key exchange.

When the first user U1 wants to access its first encrypted partition P1, the first user U1 authenticates in the electronic apparatus 100. For example, the first user U1 inputs his username and password, when the electronic apparatus 110 request them on a 'login' screen. The operating system 110 or the electronic apparatus 100 performs authentication based on the username and password provided, as represented in FIG. 3B.

If the user is authenticated, the operating system 110 or the electronic apparatus 100 requests the secure element SS to send the first key K1 stored therein to the operating system 110 or the electronic apparatus 100. In the case exemplified, the first user U1 is the proprietor of the first secure element S1 or has a permission to access the secure element SS. Thus, the temporary secure channel 120 is established by the key agreement protocol and the first key K1 is delivered on the temporary secure channel 120.

The operating system 110 or the electronic apparatus 110 stores the transferred first key K1 into a memory of the apparatus 100. Preferably, the memory is a random access memory (RAM).

The operating system 110 uses the key K1 (170) to encrypt or decrypt the first encrypted partition P1. Thus, if the corresponding key from the secure element SS is not delivered to the memory K1 of the apparatus 100 because e.g. failure of authentication or failure of the establishment of temporary secure channel 120, the encrypted partition is not accessed. Since the secure element SS stores more than one key, the electronic apparatus 100 can be shared by multiple users without exchanging the secure element SS.

Figure 3C:
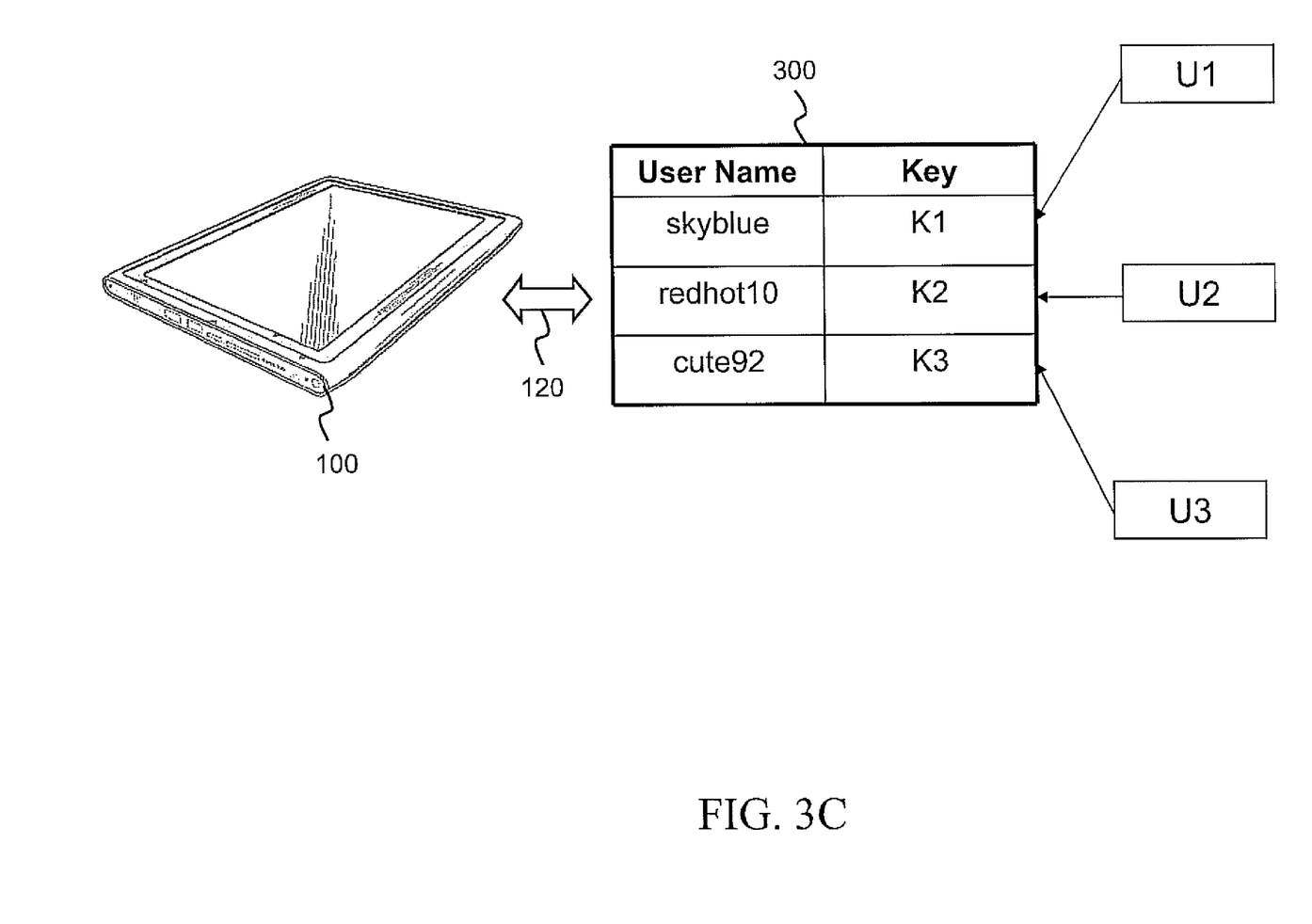
FIG. 3C schematically represents a table in the memory of a secure element SS, according to the present invention.

FIG. 3C schematically represents a table in the memory of the secure element SS according to the embodiment.

The secure element SS, e.g. SIM card, may include a key-matching table 300 in its memory. For example, the first user U1 has a username of "skyblue", the second user U2 has a username of "redhot10", and the third user U3 has a username of "cute92". Each users name is stored in each record of the key matching table 300 with its corresponding key K1, K2, K3. The key can be created when each user accesses the electronic apparatus 100 for the first time.

In FIG. 3C, the database stores the user name data and the corresponding keys in plain form. However, data can be stored in the table in encrypted form, for improved protection, preferably using the ciphering/deciphering capability directly provided by the microcontroller of the secure element. More particularly, one or more cryptographic keys are stored in a microchip of the secure element and are not known outside it. Advantageously, according to this aspect, the cryptographic key cannot be read from secure element, nor can its content be inspected using an electronic microscope.

When the second user U2 is authenticated by the electronic apparatus 100 with his username and matching password, the electronic apparatus 100 requests the secure element SS to detect the corresponding key in its internal table. The secure element SS detect in the key-matching table 300 the second key K2 and thus the secure channel 120 is established by key exchanging protocol, and the key K2 retrieved by the secure element SS is transferred to the electronic apparatus 100. At last, the key is used for decrypting and/or encrypting the corresponding partition.

Figure 4:
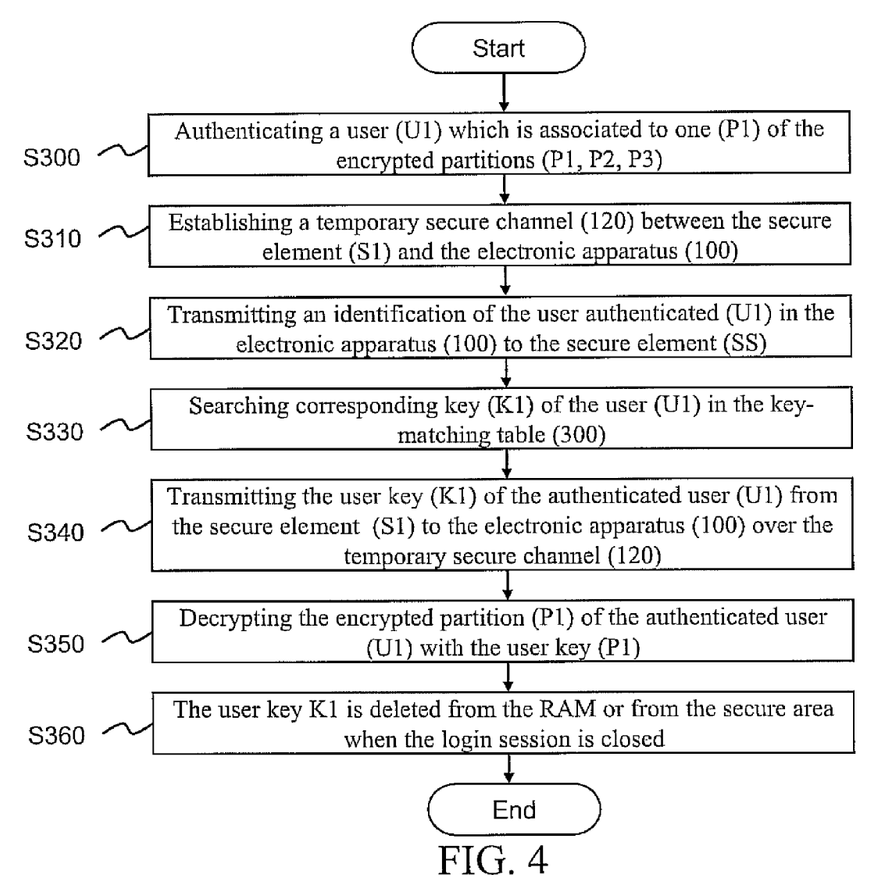
FIG. 4 schematically is a flowchart with the steps of the method executed in the secure element and electronic apparatus of FIGS. 3C and 3B.

The method executed with a secure element including more than one key is explained more in detail in the flowchart of FIG. 4.

The electronic apparatus 100 authenticates a user U1 which is associated to one P1 of the encrypted partitions P1, P2, P3 at step S300. The authentication by the electronic apparatus 100 may be executed by the username and the corresponding password inputted by the user U1 into the electronic apparatus 100 through a user interface of the electronic apparatus 100.

A temporary secure channel 120 is established between the secure element S1 and the electronic apparatus 100 at step S320. The electronic apparatus 100 transmits an identification of the user authenticated U1 in the electronic apparatus 100 to the secure element SS at step S320.

The secure element S1 transmits the user key K1 of the authenticated user U1 to the electronic apparatus 100 over the temporary secure channel 120 at step S340. The secure channel 120 is created through a key agreement protocol preferably based on a Diffie-Hellman key exchange. The secure element SS stores at least one record in an internal memory comprising a first field having data associated with the user-name of the user U1 and a second field having data associated with the user key K1.

At step S330, the secure element SS detects corresponding key K1 of the user U1 in the key-matching table 300 of FIG. 3C.

The electronic apparatus decrypts the encrypted partition P1 of the authenticated user U1 with the user key K1 at step S350. The user key K1 is deleted from the RAM or from the secure area when the login session is closed at S360.

As already explained in a previous embodiment, the exact timing of the secure channel 120 established at Step S310 may vary over implementations. For example, the step S310 may take place after the step S320.

The user key received from the secure element SS may be stored in a RAM 170 or in a secure area 170 of the memory of the electronic apparatus for a login session of the user in the electronic apparatus.

Figure 5:
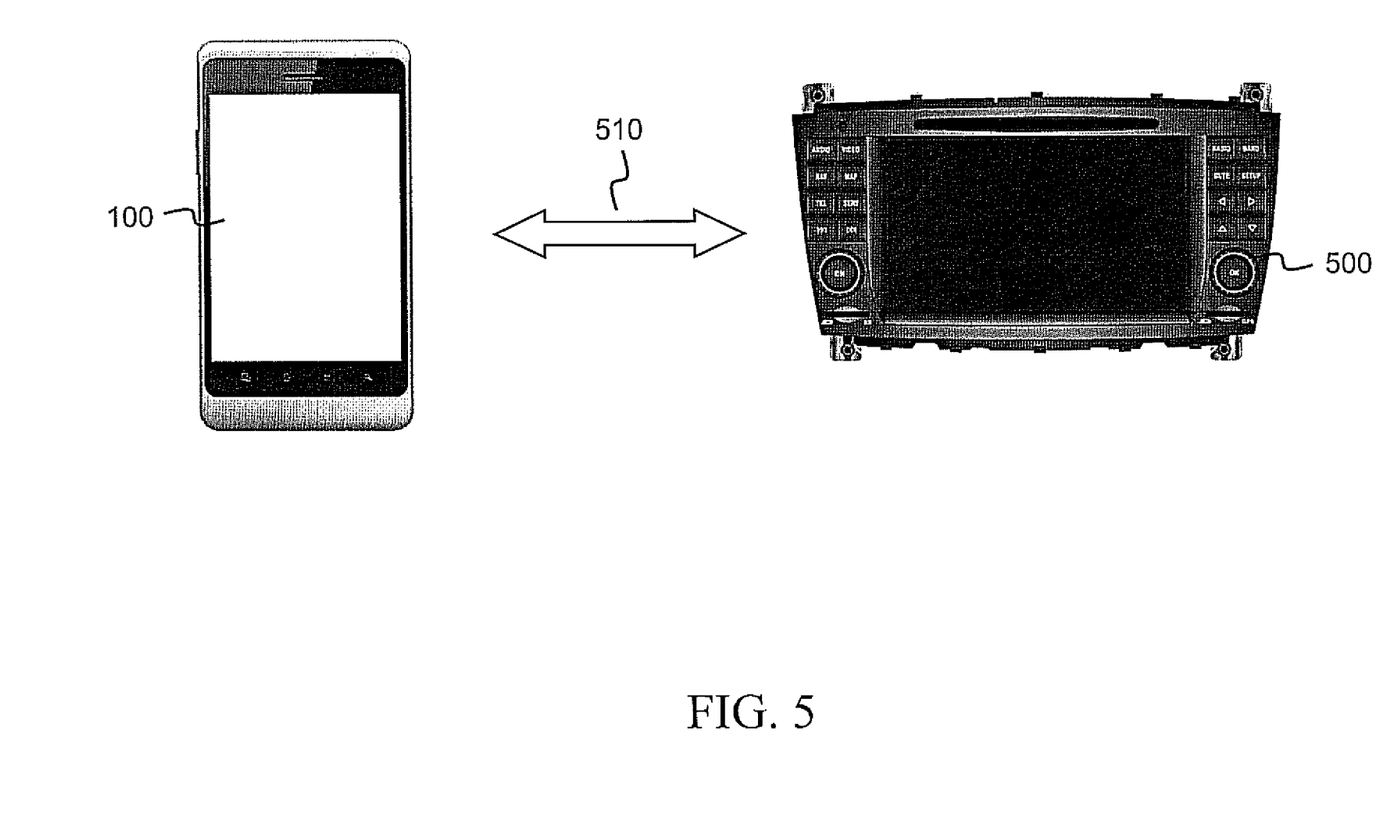
FIG. 5 schematically represents the electronic apparatus of the invention in communication with another electronic apparatus.

FIG. 5 schematically represents the electronic apparatus of the invention in communication with another electronic apparatus.

A second electronic apparatus 500 may establish a wireless connection 510 with the electronic apparatus 100 through a wireless protocol, preferably near field communication (NFC) 510. The key K1 stored in the secure element SS is transmitted to the second electronic apparatus 500 through the secure channel 120 and the wireless connection 510. The encrypted partition P1 can be downloaded to the second electronic apparatus 510 from the electronic apparatus 100 or from a cloud storage storing a duplicated data associated with the encrypted partition P1.

For example, the second electronic apparatus 500 is a navigation system 500 installed in a car and the electronic apparatus 100 is a smartphone 100 including the secure element SS. The user U1 rents the car having the navigation system inside and use the interface provided by the navigation system to access the data securely stored in the smartphone 100. More particularly, first, the user input his username and password on the navigation system to authenticate himself or he insert his username and corresponding password for authentication in the smartphone. When the authentication succeeds, the smart-phone 100 and the navigation system 500 establish NFC connection 510 there between. Then, the smartphone 100 retrieves the key K1 for the user U1 from its secure element SS and transfer the key K1 to the navigation system 500. The key may be encrypted for the transmission on the wireless connection 510, using a secure channel previously established, e.g. using a Diffie-Hellman key agreement protocol. The navigation system 500 downloads the encrypted partition P1 from the smartphone 100 or a cloud storage having a duplicated data associated with P1. Then, the navigation system 500 uses the key K1 to decrypt the encrypted partition P1.

Advantageously, the user's personal data can be restored as it is in the second electronic apparatus 500, i.e. navigation system, without compromising the security or the privacy of the data. For example, even if the encrypted partition is not completely deleted in the second apparatus after the user close his session in the second device, third party cannot see the data in the encrypted partition, because they don't have the corresponding key.

In a same way, a device embedded or connected to a rented car and configured to electronically adjust some apparatuses of the car, for instance a seat, a heating plant or a driving mirror, can download the encrypted partition P1 from the smartphone 100 or from a cloud storage and use the key K1 to decrypt the encrypted partition P1. For instance, the encrypted partition may include data for configuring the position of the seats or of the driving mirror, and to set up a preferred temperature inside the car, etc, etc.

The invention claimed is:

1. An access method for an electronic apparatus comprising a processor and a storage area including data for a plurality of registered users of the electronic apparatus, the method comprising:
   storing a plurality of encrypted partitions in the storage area of the electronic apparatus, with each encrypted partition corresponding to a registered user;
   receiving a secure element from a registered user, with the secure element storing a user key for decrypting an encrypted partition corresponding to the registered user providing the user key;
   establishing a temporary secure channel between the secure element and the electronic apparatus;
   authenticating in the electronic apparatus the registered user associated with the corresponding encrypted partition; and
   transmitting an identification of the registered user authenticated in the electronic apparatus to the secure element, and transmitting the user key of the authenticated registered user from the secure element to the electronic apparatus over the temporary secure channel;
   wherein the electronic apparatus is programmed to decrypt the encrypted partition of the authenticated registered user with the user key transmitted over the temporary secure channel;
   wherein the encrypted partition of the authenticated registered user is not accessible to the authenticated user or to any other authenticated users in the electronic apparatus if the user key of the authenticated registered user is not transmitted to the electronic apparatus;
   wherein the secure element comprises an IC Card of a telecom operator and the telecom operator blocks the IC Card to deny a decryption of the encrypted partition, with the block being executed on a user's request and through OTA messaging.

2. The method according to claim 1 wherein the user key received from the secure element is stored in a RAM or in a secure area of the memory of the electronic apparatus for a login session of the user in the electronic apparatus; and wherein the user key is deleted from the RAM or from the secure area when the login session is closed.

3. The method according to claim 1 wherein the IC card is configured as a SIM card, an SD card or a Secure Dongle, and the encrypted partition stores at least one of personal data, files, application, and application data.

4. The method according to claim 1 wherein the secure channel is created through a key agreement protocol based on a Diffie-Hellman key exchange.

5. The method according to claim 1 wherein the secure element stores at least one record in an internal memory; wherein a first field of the record includes data associated with the username of the user, and a second field of the record includes data associated with the user key.

6. The method according to claim 5 wherein the authentication by the electronic apparatus is executed by the username and a corresponding password inputted by the user into the electronic apparatus through a user interface of the electronic apparatus; and wherein the username inputted is used for searching the user key in the secure element.

7. The method according to claim 6 wherein a record is created in the secure element each time a Previously Presented user enters a username and a password not previously stored in the electronic apparatus; and wherein the key for the new user is created in the secure element and associated with the username in the record created in the secure element.

8. The method according to claim 1 wherein another electronic apparatus is configured to establish a wireless connection with the electronic apparatus through a wireless protocol; and wherein the key stored in the secure element is transmitted to the another electronic apparatus through the secure channel and the wireless connection is established after the user is authenticated in the electronic device.

9. The method according to claim 8 wherein the wireless protocol comprises a near field communication (NFC) protocol.

10. The method according to claim 1 wherein the encrypted partition is configured to be downloaded to another electronic apparatus from the electronic apparatus.

11. The method according to claim 1 wherein the encrypted partition is configured to be downloaded to another electronic apparatus from a cloud storage storing a duplicated data associated with the encrypted partition.

12. An access method for an electronic apparatus for a plurality of registered users of the electronic apparatus, the method comprising:
   storing a plurality of encrypted partitions in the electronic apparatus, with each encrypted partition corresponding to a registered user;
   receiving a secure element from a registered user, with the secure element storing a user key for decrypting an encrypted partition corresponding to the register user providing the user key;
   establishing a temporary secure channel between the secure element and the electronic apparatus;
   authenticating in the electronic apparatus the registered user associated with the corresponding encrypted partition;
   transmitting an identification of the registered user authenticated in the electronic apparatus to the secure element, and transmitting the user key of the authenticated registered user from the secure element to the electronic apparatus over the temporary secure channel; and
   decrypting in the electronic apparatus the encrypted partition of the authenticated registered user with the user key transmitted over the temporary secure channel;
   wherein the user key received from the secure element is stored in a memory of the electronic apparatus for a login session of the registered user in the electronic apparatus, and the user key is deleted from the RAM or from the secure area when the login session is closed.

13. The method according to claim 12 wherein the secure element comprises an IC Card of a telecom operator and the telecom operator blocks the IC Card to deny a decryption of the encrypted partition, the block being executed on a user's request and through OTA messaging.

14. The method according to claim 12 wherein the secure element comprises a SIM card, an SD card or a Secure Dongle, and the encrypted partition stores at least one of personal data, files, application, and application data.

15. The method according to claim 12 wherein the secure channel is created through a key agreement protocol based on a Diffie-Heliman key exchange.

16. A method for accessing an encrypted partition from a plurality of encrypted partitions in of a storage area of an electronic apparatus including a secure element, with each encrypted partition corresponding to a registered user of the electronic apparatus and being accessible by an authenticated registered user, the method comprising:
   authenticating a registered user at the electronic apparatus based on user input to the electronic apparatus provided by the registered user;

transferring credential information associated with the registered user from the electronic apparatus to the secure element; and establishing a secure channel between the secure element and the electronic apparatus, and transferring a key used for decrypting the encrypted partition from the secure element to the electronic apparatus through the secure channel;

wherein the secure element comprises an IC Card of a telecom operator and the telecom operator blocks the IC Card to deny a decryption of the encrypted partition, with the block being executed on a user's request and through OTA messaging.

17. An electronic apparatus comprising:

a processor and a memory coupled thereto and configured to store a plurality of encrypted partitions, with each encrypted partition corresponding to a registered user of the electronic apparatus and being accessible by an authenticated registered user, establish a temporary secure channel to communicate with a secure element which stores a user key for decrypting a corresponding one of the plurality of encrypted partitions, with the secure element being provided by a registered user, authenticate the registered user associated with the corresponding encrypted partition, transmit an identification of the registered user authenticated to the secure element and receive a user key of the authenticated registered user from the secure element over the temporary secure channel, and decrypt the encrypted partition of the authenticated registered user with the user key transmitted over the temporary secure channel and while preventing access to the encrypted partition of the authenticated registered user if the user key of the authenticated registered user is not transmitted to the electronic apparatus;

with the user key received from the secure element being stored in the memory for a login session of the registered user, and with the user key being deleted from the memory when the login session is closed.

18. A secure apparatus coupled with an electronic device configured to establish a temporary secure channel to communicate with the secure apparatus which stores at least one user key for decrypting corresponding one of a plurality of encrypted partitions, with each encrypted portion corresponding to a registered user, authenticate a registered user associated to the corresponding one of the encrypted partitions, transmit an identification of the registered user authenticated to the secure apparatus and receive a user key of the authenticated registered user from the secure apparatus over the temporary secure channel, and encrypt the encrypted partition of the authenticated registered user with the user key transmitted over the temporary secure channel and while preventing access to the encrypted partition of the authenticated registered user if the user key of the authenticated registered user is not transmitted to the electronic device, the secure apparatus comprising:

a processor and a memory cooperating therewith and configured to store the user key for decrypting the corresponding encrypted partition, establish the temporary secure channel to communicate with the electronic device, and receive the identification of the registered user authenticated in the electronic device and transmit the user key of the authenticated registered user to the electronic device over the temporary channel;

with the secure apparatus comprising an IC Card of a telecom operator and the telecom operator blocks the IC Card to deny a decryption of the encrypted partition, with the block being executed on a user's request and through OTA messaging.

19. The secure apparatus according to claim 18 wherein the IC card is configured as a SIM card, an SD card or a Secure Dongle.

20. The secure apparatus according to claim 18 further comprising a housing carrying said processor and memory and configured to be embedded or removable from the electronic device.

* * * * *